H. WEBER.
TOOL FOR CENTERING SPROCKETS UPON VEHICLE WHEELS.
APPLICATION FILED DEC. 16, 1910.
1,013,911.
Patented Jan. 9, 1912.
2 SHEETS—SHEET 1.
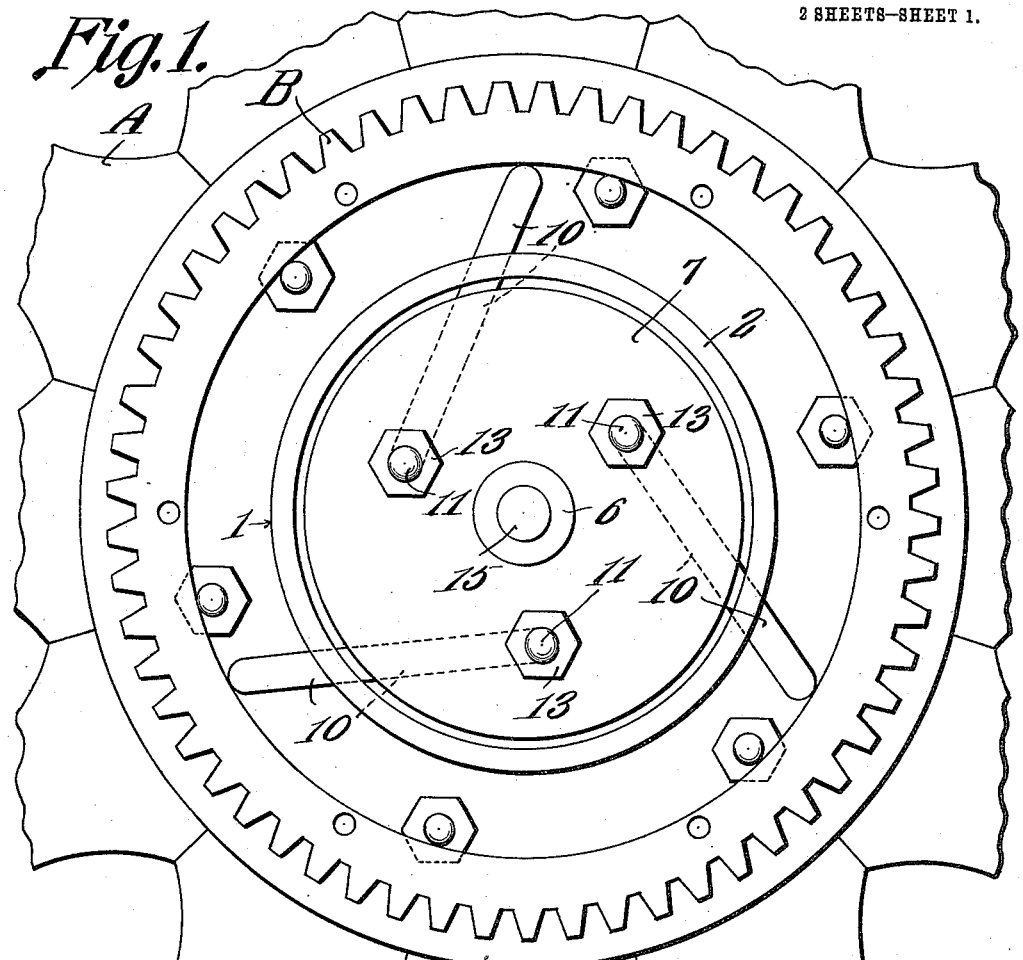
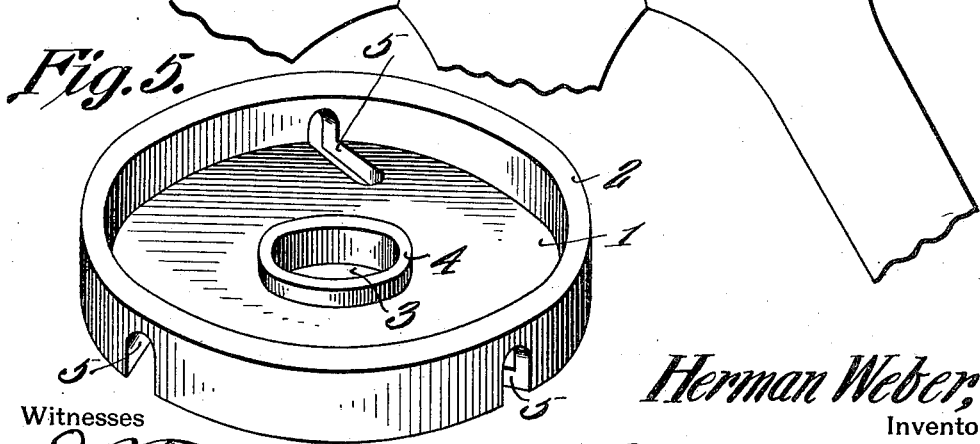
Witnesses
Herman Weber,
Inventor
by C. A. Snow & Co.
Attorneys H. WEBER.
TOOL FOR CENTERING SPROCKETS UPON VEHICLE WHEELS.
APPLICATION FILED DEC. 16, 1910.
1,013,911.
Patented Jan. 9, 1912.
2 SHEETS—SHEET 2.
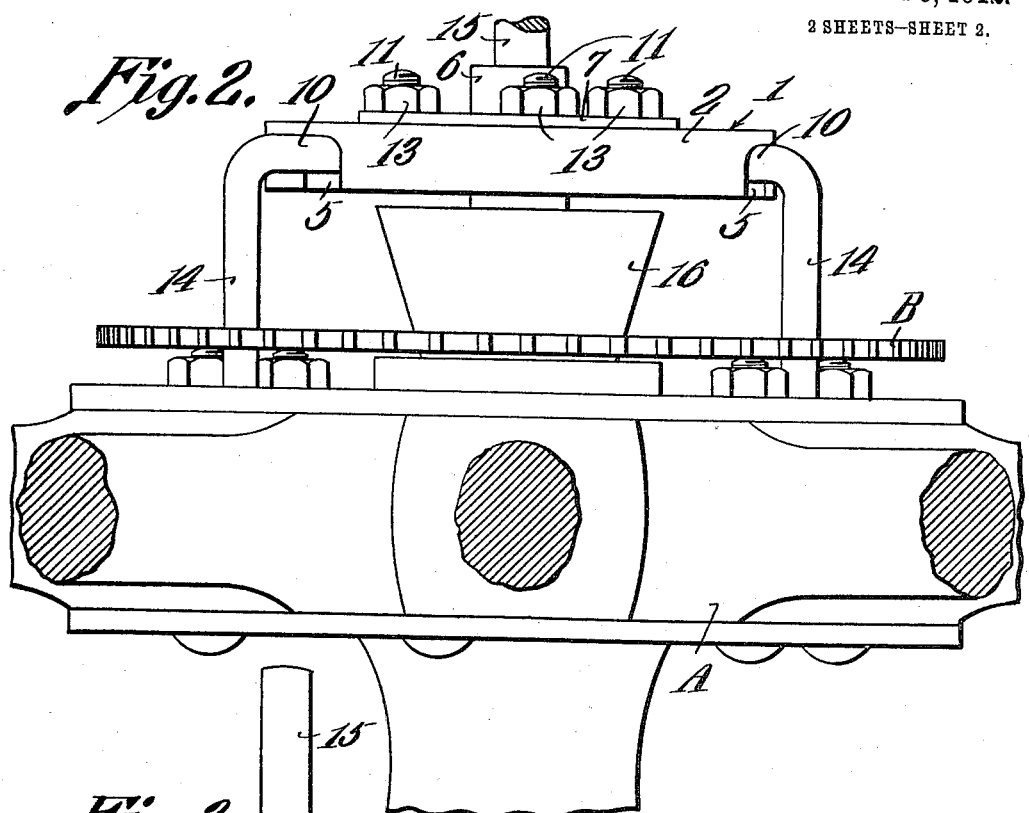
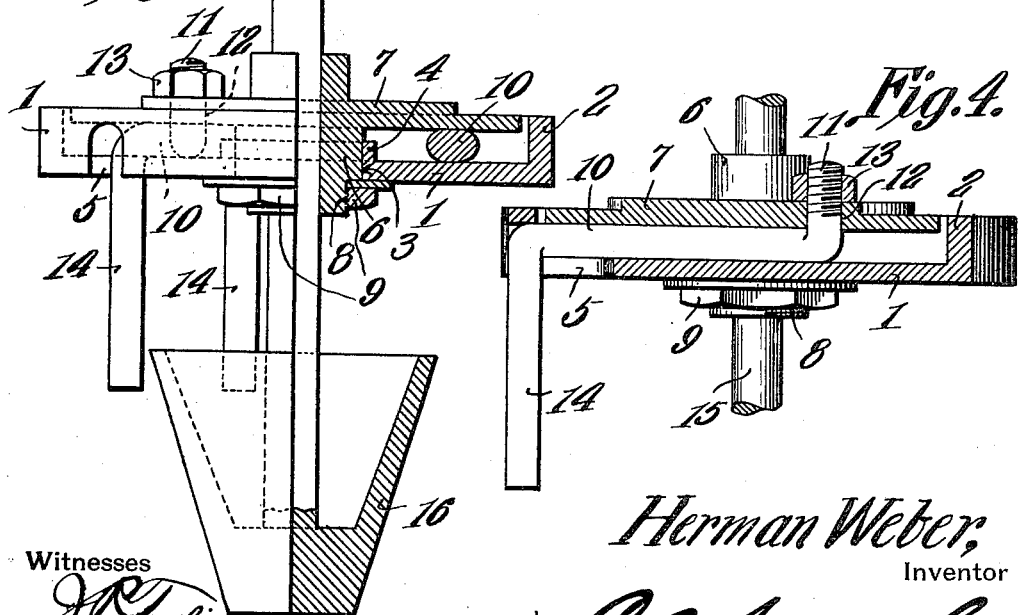
Witnesses
Herman Weber,
Inventor
by C. A. Snow & Co.
Attorneys

UNITED STATES PATENT OFFICE.

HERMAN WEBER, OF COLORADO SPRINGS, COLORADO.

TOOL FOR CENTERING SPROCKETS UPON VEHICLE-WHEELS.

1,013,911. Specification of Letters Patent. Patented Jan. 9, 1912.

Application filed December 16, 1910. Serial No. 597,593.

*To all whom it may concern:*

Be it known that I, HERMAN WEBER, a citizen of the United States, residing at Colorado Springs, in the county of El Paso and State of Colorado, have invented a new and useful Tool for Centering Sprockets upon Vehicle-Wheels, of which the following is a specification.

This invention relates to tools for centering sprockets upon vehicle wheels and is more particularly designed for use in properly placing on a wheel the sprocket of a speedometer.

Heretofore it has been extremely difficult, when attaching a speedometer to a vehicle to properly center the drive sprocket upon the wheel. It has been important, however, to have this sprocket perfectly centered, as otherwise the results obtained are very unsatisfactory.

The object of the present invention is to provide a very simple form of tool which can be easily manipulated, and which will positively and accurately center the sprocket on the wheel so that the same can be attached thereto without the necessity of slow and careful adjustment such as has heretofore been required and which has not always been accurate.

With these and other objects in view the invention consists in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings:—Figure 1 is an elevation of a portion of a wheel and showing a sprocket centered thereon by means of the tool constituting the present invention. Fig. 2 is a front elevation of the parts shown in Fig. 1. Fig. 3 is a view partly in section and partly in elevation of the centering device constituting the present invention. Fig. 4 is a section through the chuck of said tool said section being taken along the line of one of the shiftable arms, said arm being shown in elevation. Fig. 5 is a perspective view of one of the members of the chuck.

Referring to the figures by characters of reference 1 designates a disk having an annular flange 2 and a central opening 3, said opening being surrounded by a smaller flange 4. Slots 5 are formed within the disk and extend through the flange 2, these slots being located at regular intervals. A hub 6 is journaled within the opening 3 and bears on the flange 4, this hub being formed at the center of another disk 7. Said disk is adapted to be surrounded by the flange 2 and one end of its hub is reduced and screwthreaded, as indicated at 8 so as to be engaged by a nut 9 adapted to hold the two disks 1 and 7 properly assembled.

Arms 10 are interposed between the two disks 1 and 7 and each arm is provided, at one end with a stud 11 extending through an opening 12 in the disk 7 and held in the opening by a nut 13 or the like. The other end of each arm has a finger 14 extending at right angles therefrom and movably mounted within one of the slots 5. The studs 11 are equidistant from the hub 6 and the arms 10 extend tangentially from the circle in which these studs 11 are located.

A stem 15 is slidably mounted within the hub 6 and is provided, at one end, with a centering cone frustum 16.

In applying the sprocket of a speedometer to a wheel, the cone frustum 16 is forced into the hub of the wheel A and the sprocket B is then placed around the centering device. The chuck, which is made up of the disks 1 and 7 and the parts carried thereby, is shifted along the stem 15 until the ends of the fingers 14 are brought inside of the sprocket. By then holding the fingers 14 and disk 7 against rotation about the stem 15 and then rotating the disk 1, the arms 10 will be simultaneously swung so as to project the fingers 14 away from the stem 15 and against the inner edge of the sprocket. As the movement of all of the fingers will be the same it will be seen that, when these fingers are brought into contact with the sprocket, said sprocket will be held concentric with the centering device 16. The sprocket can then be attached to the wheel in the usual or any preferred manner. It is of course to be understood that when the arms 14 have been shifted outwardly in the manner hereinbefore described and the sprocket has been properly centered relative to the device 16, the parts can be held against return movement by tightening the nuts 13 on the studs 11 by tightening the nut 9, or in any other manner preferred.

Although it has been stated that the fingers 14 may be adjusted against the inner edge of the sprocket, it is to be understood that, if preferred, the said fingers can be moved into engagement with the outer edge of the sprocket, when, for example, a substantially solid sprocket is employed.

What is claimed is:—

1. A tool of the class described including a centering device, parallel disks separately revoluble about the axis of said device, and members extending between and spacing the disks, said members pivotally engaging one of the disks and slidably engaging the other disk, said members having terminals, capable of projecting beyond the peripheral portions of the disks.

2. A tool of the class described including a disk having an annular flange, another disk surrounded by said flange, a centering device having a stem extending through the disks, said disks being separably revoluble about said device, members interposed between the disks and constituting spacing means, each of said members having one end pivotally engaging one of the disks and having its other end portion slidably engaging the other disk and projecting beyond the periphery thereof, and means for securing the disks against relative movement.

3. A tool of the class described including a disk having an annular flange and slots within the peripheral portion of the disk and extending into the flange, another disk surrounded by the flange, a centering device having a stem extending through the disks, said disks being separably movable upon the centering device, members interposed between the disks and constituting means for spacing them, each member having an end portion extending into and pivotally engaging one of the disks and another end portion extending through and slidable within one of the slots, said end terminating in a finger parallel with the centering device and movable within the slot, and means for securing the disks against relative movement.

In testimony that I claim the foregoing as my own, I have hereto affixed my signature in the presence of two witnesses.

HERMAN WEBER.

Witnesses:
JOHN A. FRAZER,
JOHN H. WILSON.

---

Copies of this patent may be obtained for five cents each, by addressing the "Commissioner of Patents, Washington, D. C."